(12) United States Patent
Townley et al.

(10) Patent No.: US 10,421,414 B2
(45) Date of Patent: Sep. 24, 2019

(54) CONTOUR CONNECT

(71) Applicant: LEAR CORPORATION, Southfield, MI (US)

(72) Inventors: Lisa Townley, Allen Park, MI (US); Paul S. Severinski, Brownstown, MI (US); Louella Ann Patterson, Goodells, MI (US); Larry Francis Kocher, Canton, MI (US); Pusheng Chen, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 10 days.

(21) Appl. No.: 15/799,002

(22) Filed: Oct. 31, 2017

(65) Prior Publication Data
US 2018/0154843 A1 Jun. 7, 2018

Related U.S. Application Data

(60) Provisional application No. 62/428,848, filed on Dec. 1, 2016.

(51) Int. Cl.
| B60R 13/02 | (2006.01) |
| B32B 27/08 | (2006.01) |
| B32B 27/12 | (2006.01) |
| B32B 27/40 | (2006.01) |
| B32B 3/30 | (2006.01) |
| B32B 5/02 | (2006.01) |
| B32B 5/18 | (2006.01) |
| B32B 7/12 | (2006.01) |
| F16B 1/00 | (2006.01) |
| B60N 2/882 | (2018.01) |

(Continued)

(52) U.S. Cl.
CPC ............ *B60R 13/0206* (2013.01); *B32B 3/30* (2013.01); *B32B 5/022* (2013.01); *B32B 5/18* (2013.01); *B32B 7/12* (2013.01); *B32B 27/08* (2013.01); *B32B 27/12* (2013.01); *B32B 27/40* (2013.01); *B60N 2/5833* (2013.01); *B60N 2/882* (2018.02); *F16B 1/00* (2013.01); *B32B 2605/003* (2013.01); *B60N 2002/899* (2018.02); *F16B 11/006* (2013.01); *F16B 2001/0028* (2013.01)

(58) Field of Classification Search
CPC ... B32B 2605/003; B32B 27/08; B32B 27/12; B32B 27/40; B32B 3/30; B32B 5/022; B32B 5/18; B32B 7/12; B60N 2002/899; B60N 2/58; B60N 2/882; B60R 13/0206; F16B 1/00; F16B 2001/0028
See application file for complete search history.

(56) References Cited

U.S. PATENT DOCUMENTS

| 4,775,310 A | * | 10/1988 | Fischer | .............. A44B 18/0049 425/308 |
| 5,231,738 A | * | 8/1993 | Higashinaka | ........ A44B 18/003 24/446 |
| 5,676,642 A | * | 10/1997 | Peters | ................... A61F 5/0127 602/23 |

(Continued)

*Primary Examiner* — Robert Sandy
*Assistant Examiner* — David M Upchurch
(74) *Attorney, Agent, or Firm* — Brooks Kushman P.C.

(57) ABSTRACT

A contour connect system for applying a vehicle trim includes a fabric loop and a low-profile hook component. The fabric loop component includes a spacer layer, Class A surface layer, and a loop-containing layer, the Class A surface layer being adhered to one side of spacer layer while the loop-containing layer is adhered to the opposite side of spacer layer.

20 Claims, 6 Drawing Sheets

(51) Int. Cl.
*B60N 2/58* (2006.01)
*B60N 2/80* (2018.01)
*F16B 11/00* (2006.01)

(56) References Cited

U.S. PATENT DOCUMENTS

| | | | |
|---|---|---|---|
| 7,998,548 B2 | 8/2011 | Murasaki et al. | |
| 8,512,845 B2 | 8/2013 | Terada et al. | |
| 8,795,564 B2 | 8/2014 | Murasaki et al. | |
| 9,072,343 B1* | 7/2015 | Ogilvie | A44B 18/0023 |
| 9,271,546 B2 | 3/2016 | Terada et al. | |
| 9,357,815 B2 | 6/2016 | Minato et al. | |
| 2002/0009568 A1* | 1/2002 | Bries | A47G 1/175 |
| | | | 428/40.1 |
| 2002/0114909 A1* | 8/2002 | Aiello | A44B 18/0073 |
| | | | 428/40.1 |
| 2006/0069380 A1* | 3/2006 | Chen | A44B 18/0003 |
| | | | 604/391 |
| 2006/0154017 A1* | 7/2006 | Shepard | A44B 18/0049 |
| | | | 428/99 |
| 2007/0017034 A1* | 1/2007 | Creekmuir | A47C 31/026 |
| | | | 5/717 |
| 2007/0098953 A1* | 5/2007 | Stabelfeldt | A61F 13/58 |
| | | | 428/100 |
| 2007/0119032 A1* | 5/2007 | Efremova | A44B 18/0003 |
| | | | 24/305 |
| 2012/0027987 A1* | 2/2012 | Poulakis | H01R 13/6485 |
| | | | 428/100 |
| 2014/0130311 A1 | 5/2014 | Okuda et al. | |
| 2015/0250271 A1* | 9/2015 | Ogilvie | A44B 18/00 |
| | | | 24/444 |
| 2016/0128877 A1* | 5/2016 | Chandrasekaran | C09J 7/29 |
| | | | 24/306 |
| 2017/0087034 A1* | 3/2017 | Bosser | B32B 5/022 |

* cited by examiner

CONTOUR CONNECT

CROSS-REFERENCE TO RELATED APPLICATIONS

This application claims the benefit of U.S. provisional application Ser. No. 62/428,848 filed Dec. 1, 2016, the disclosure of which is hereby incorporated in its entirety by reference herein.

TECHNICAL FIELD

In at least one aspect, the present invention is related to systems for connecting vehicle trim to a component such as a vehicle seat.

BACKGROUND

Prior hook and loop connection system are disclosed in U.S. Pat. Nos. 7,998,548; 8,512,845; 8,795,564; 9,271,546 and 9,357,815, for example

SUMMARY

The present invention solves one or more problems in the prior art by providing in at least one embodiment, a contour connect system for applying a vehicle trim on vehicle cabin components. The contour connect system includes a fabric loop and a low-profile hook component. The fabric loop component includes a spacer layer, a Class A surface layer, and a loop-containing layer, the Class A surface layer being adhered to one side of spacer layer while the loop-containing layer is adhered to the opposite side of spacer layer. Advantageously, the contour connect system allows a leather vehicle trim to be installed on a vehicle interior component such as a vehicle seat without wrinkling that plagues many prior art systems.

In another embodiment, a contour connect system for applying a vehicle trim on vehicle cabin components is provided. The contour connect system includes a fabric loop and a low-profile hook component. The fabric loop component includes a spacer layer, a Class A surface layer, and a loop-containing layer, the Class A surface layer being adhered to one side of spacer layer while the loop-containing layer is adhered to the opposite side of spacer layer. Characteristically, the spacer layer includes an upper layer and a lower layer with supporting threads arranged between the upper layer and the lower layer;

DETAILED DESCRIPTION

Figure 1:
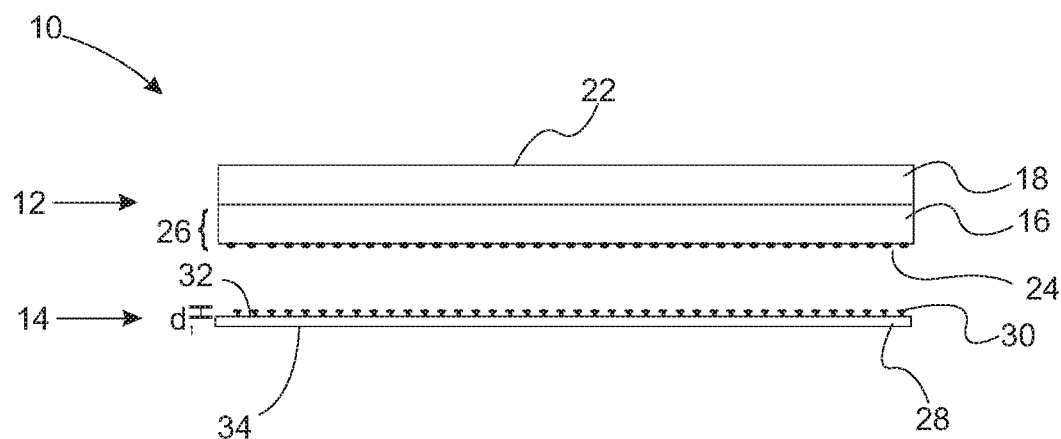
FIG. 1 provides a schematic cross section of a contour connect system with the loop and hook component separated.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "Class A surface" means a surface of high efficiency and/or quality that when placed in a finished part will be viewable by a user. Such a surface will typically be freeform and/or a 3-dimensional surface.

Figure 2:
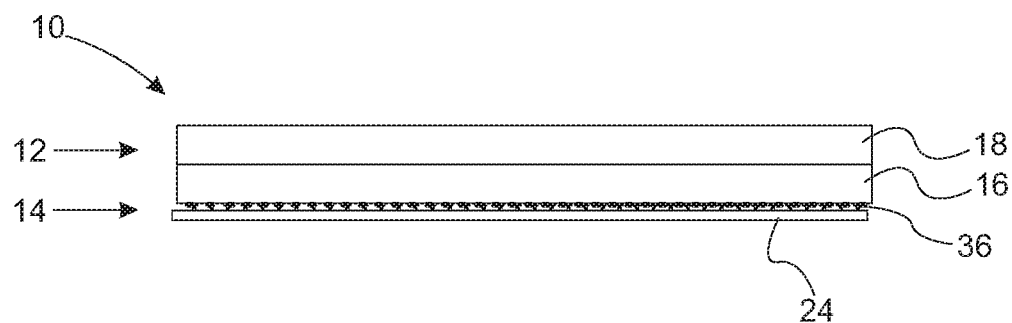
FIG. 2 provides a schematic cross section of a contour connect system with the loop component attached to the hook component.
Figure 3:
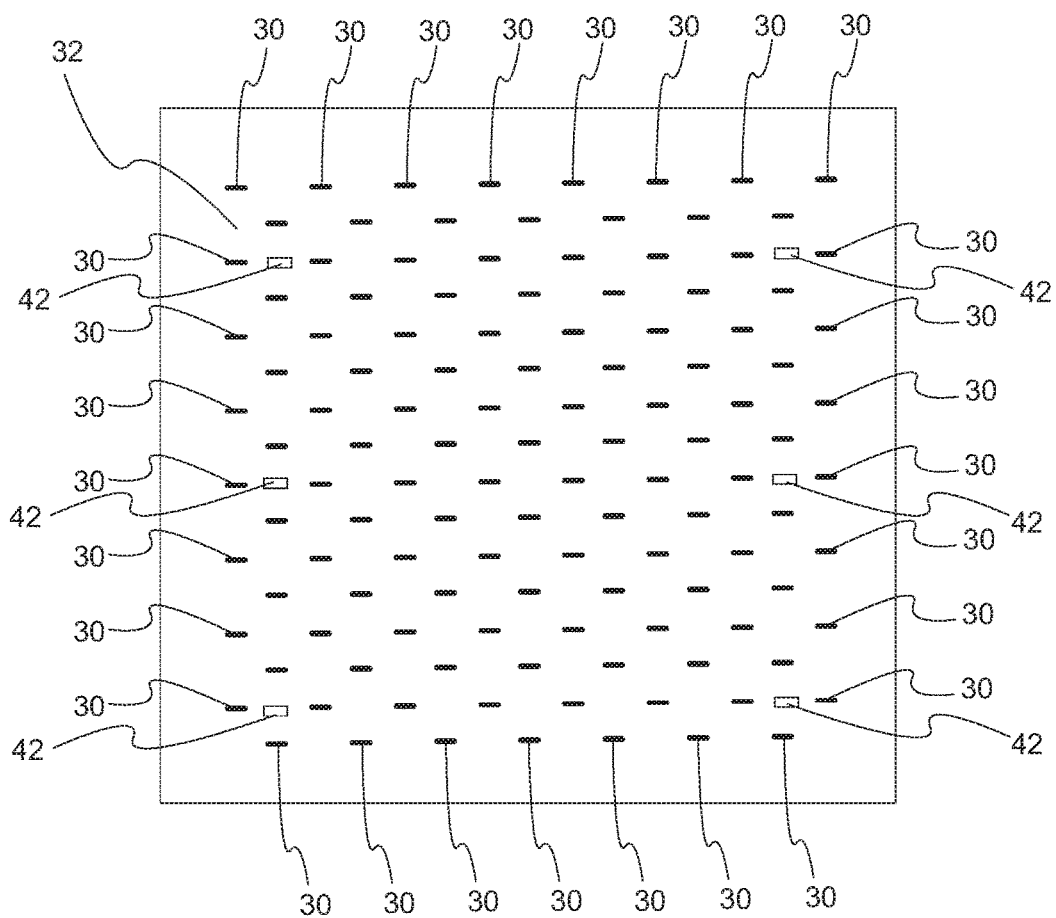
FIG. 3 is a top view of a low-profile hook layer used in the contour connect system of FIGS. 1 and 2.
Figure 4A:
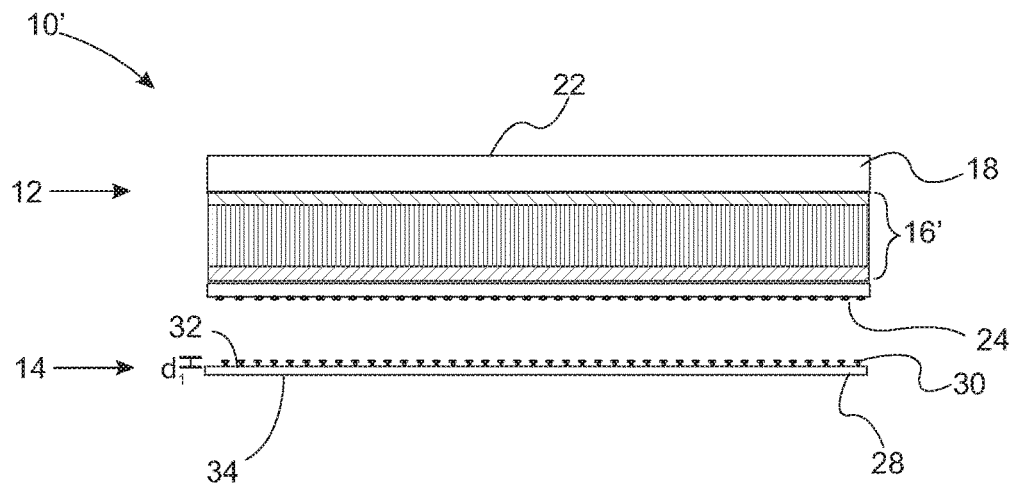
FIG. 4A provides a schematic cross section of a breathable contour connect system with the loop and hook component separated.
Figure 4B:
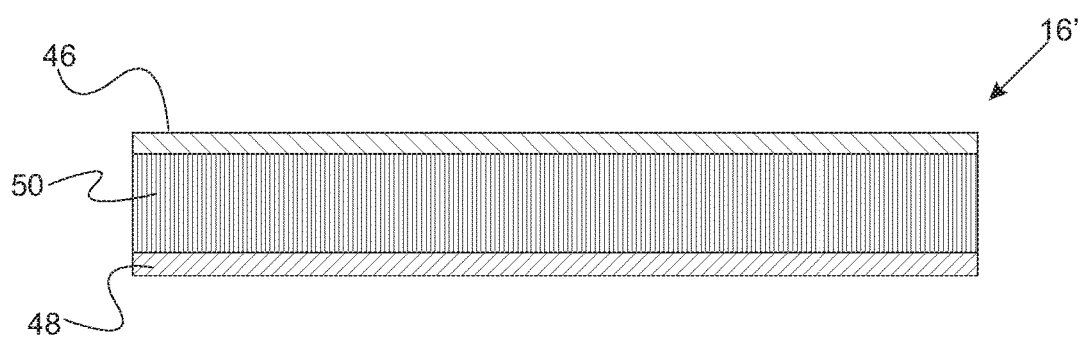
FIG. 4B provides a schematic cross section of multilayer spacer used in the breathable contour connect system of FIG. 4A.

With reference to FIGS. 1, 2, and 3, schematic illustrations of a contour connect system are provided. Contour connect system 10 includes a fabric loop component 12 and low-profile hook component 14. In a refinement, fabric loop component 12 includes a spacer layer 16 which can be a double needle bar spacer vent material or other woven spacer vent material, or, alternatively, a non-ventable foundation material such as a non-woven sheet or polyurethane foam. It should be appreciated that any number of different kinds of woven or non-woven polymeric sheets or polymeric foams can be used for spacer layer 16. Spacer layer 16 typically has a thickness from about 1 mm to 50 mm. Class A surface layer 18 is adhered to one side of spacer layer 16 while a loop-containing layer 24 is adhered to the opposite side of spacer layer 16. A side/face of Class A surface layer 18 provides the Class A surface of the vehicle trim. Class A surface can be formed from virtually any suitable sheet material and in particular, leather, fabric, or vinyl. In vehicle interior applications, face 22 of Class A surface layer 18 is the visible component of the trim covering. In some variations, Class A surface layer 18 can have a decorative pattern embossed or debossed on face 22. Such decorative patterns can be formed by the methods set forth in attachment A. In one refinement, loop-containing layer 24 is a napped fabric having a napped surface that provides the loops for locking to low profile hook component 14. Spacer layer 16 and loop-containing layer 24 can be bonded or laminated together to form composite bilayer 26 which is subsequently attached to Class A surface layer 18.

Spacer layer 16 typically has an average thickness from about 1 mm to 50 mm. Within a given application, the thickness of spacer layer 16 can vary due the elasticity and/or resiliency of this layer. This elasticity and/or resiliency advantageously allow the thickness to adjust to fill pockets that may be present in Class A surface layer 18 especially when decorative patterns are embossed thereon. Loop-containing layer 24 typically has an average thickness from about 0.5 mm to about 5 mm. Class A surface layer 18 typically has an average thickness from about 0.5 mm to about 5 mm.

In one variation, Class A surface layer 18 and spacer layer 16 are adhered by lamination and/or with adhesives. For example, an adhesive web can be interposed between Class A surface layer 18 and spacer layer 16. In one variation, the adhesive web is thermally activated by heating to provide the bond between these layers. In another refinement, the Class A surface layer 18 is adhered by radiofrequency ("RF") welding or bonding as set forth in attachment A. In order to facilitate adhesion of Class A surface layer 18 to spacer layer 16, spacer layer 16 can be formed from various polymeric yarns and in particular, bi-component polyurethane yarns. In some lamination processes, the Class A surface layer 18 and spacer layer 16 are laminated using a patterned roller that applies adhesive in specific locations. In variation, the polyurethane bi-component yarn having an inner core and outer sheath with melt at different temperatures (e.g., the sheath melts at a lower temperature). Such bi-component yarns are useful for bonding Class A surface layer 18 to spacer layer 16.

Still referring to FIGS. 1, 2, and 3, low profile hook component 14 is typically a low-profile hook layer having a sheet 28 from which hooks 30 extend from surface 32. In this context, "low profile means that the hooks do not extend a long distance from sheet 28. In a refinement, low profile hook component 14 has a thickness $d_1$ of from about 0.5 to 2.5 mm which in measured from the tops of the hooks to the top of bottom surface 34. In another refinement, low profile hook component 14 has a thickness $d_1$ of from about 1 to 1.8 mm. In still another refinement, low profile hook component 14 has a thickness $d_1$ of from about 1.2 to 1.5 mm.

The use of low-profile hook components 14 is advantageous for a number of reasons. Such low-profile hook components can be less aggressive than other comparable hook components, meaning that they can have reasonably-low peel strength (to allow easy repositioning of the trim covering if needed during attachment or reattachment of the trim covering during assembly or servicing of the seat), while still having sufficiently-high sheer strength (to assure that the trim covering stays in place during ingress and egress of an occupant from the seat). The low profile of the barbs of low-profile hook components 14 also helps assure that the hooks don't intrude through the Class A surface of the trim covering over time.

Advantageously, low profile hook component 14 is flexible thereby allowing it to easily conform to seat contours. In a refinement, an adhesive or an adhesive layer can be applied to bottom surface 34 in order to adhere low profile hook component 14 to a vehicle component (e.g., a foam substrate in a vehicle seat or head restraint). As an additional refinement, low profile hook component 14 can be affixed to a foam cushion after molding or during molding of the foam cushion. The low-profile hook component can have a vented or perforated substrate, such that when the foam is molded, foam permeates the venting in order to hold the low-profile hook component in place. Alternatively, features can be provided on the substrate of the low-profile hook component, such as tabs or projections, that are captured in the foam when molded.

An example of a low-profile hook layer is the HALCO™ low profile hook layer is a molded Nylon (i.e., aliphatic or semi-aromatic polyamides). Loop-containing layer 24 interlocks with hook layer 26 to form attachment layer 36 as depicted in FIG. 2. As appropriate to minimize or eliminate "oil can" type sounds as the low-profile hook component 14 flexes during ingress or egress of an occupant from the seat, one or more slits 42 may be provided in low profile hook components 14.

With reference to FIGS. 4A, 4B, 5A, and 5B, a variation of spacer layer 16 that is breathable is provided. In a variation, contour connect system 10' includes a fabric loop component 12 and low-profile hook component 14 as set forth able. In this variation, fabric loop component 12 includes a multilayer spacer layer 16'. As set forth above, spacer layer 16 typically has a thickness from about 1 mm to 50 mm. Class A surface layer 18 is adhered to one side of spacer layer 16 while a loop-containing layer 24 is adhered to the opposite side of spacer layer 16. A side/face of Class A surface layer 18 provides the Class A surface of the vehicle trim. In one refinement, loop-containing layer 24 is a napped fabric having a napped surface that provides the loops for locking to low profile hook component 14. Spacer layer 16 and loop-containing layer 24 can be bonded or laminated together to form composite bilayer 26 which is subsequently attached to Class A surface layer 18.

Still referring to FIGS. 4A, 4B, 5A, and 5B, spacer layer 16' is a knitted fabric having an upper layer 46 and bottom layer 48 with supporting threads 50 arranged between the upper layer and the lower layer. In a refinement, upper layer 46 and lower layer 48 are textile layers and in particular, woven textile layers. The supporting threads connect the upper and the lower layers to one another. In a refinement, at least parts of a plurality of supporting threads 50 are connected to one another at crossing points. In a further refinement, an upper layer 46, bottom layer 28, and supporting threads 50 are formed from a polymer such as polyester, polyethylene, polypropylene, and the like. In a refinement, an upper layer 46, bottom layer 48, and supporting threads 50 are formed from monofilament fibers haven a denier from about 10 to 50 denier.

Figure 5A:
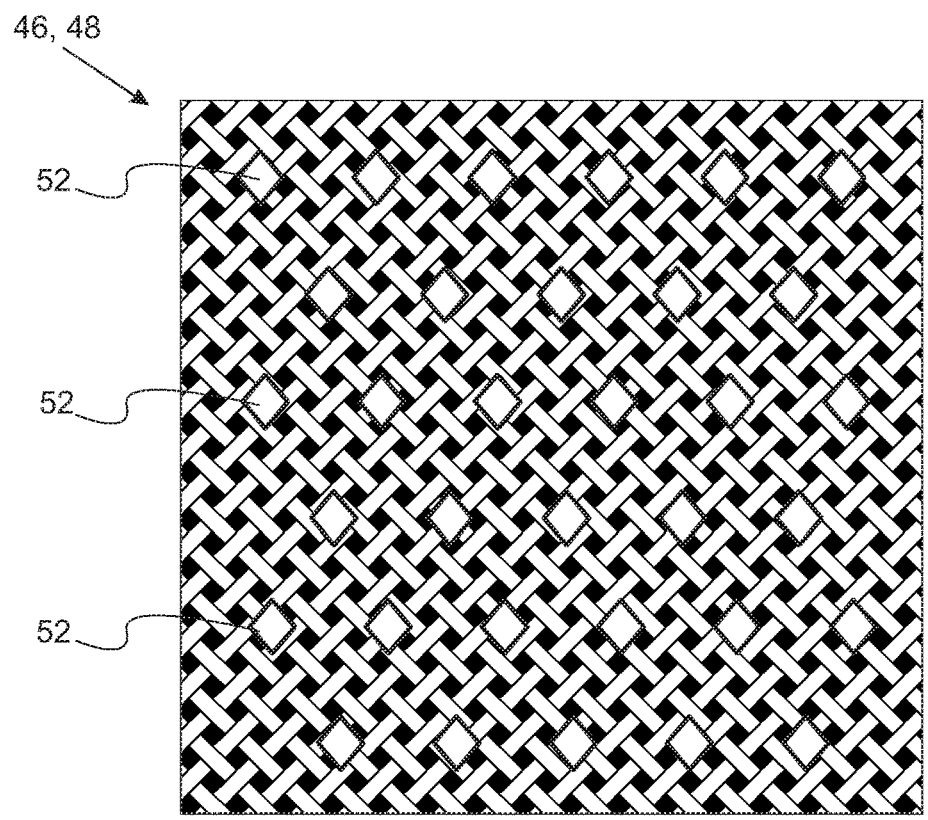
FIG. 5A is a top view of the top or bottom layer of a multilayer spacer used in the breathable contour connect system of FIG. 4A.
Figure 5B:
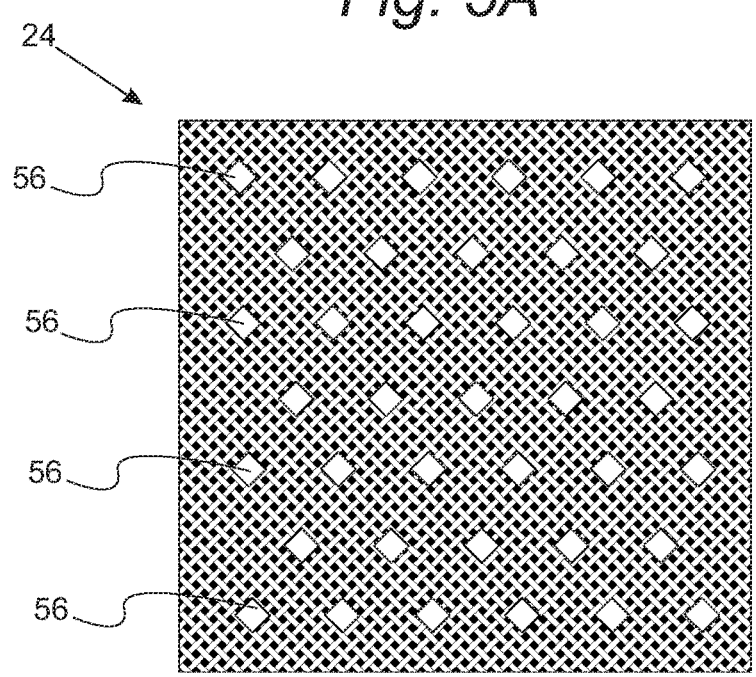
FIG. 5B is a top view of the loop-containing layer used in a breathable contour connect system.

Still referring to FIGS. 5A and 5B, a refinement, one or both of upper layer 46 and bottom layer 48 define a plurality of opening 52 that allow the passage of gases (e.g., air). In a further refinement, each opening has a cross section area of about 4 mm$^2$ to 25 mm$^2$. In most applications, opening 52 are defined by bottom layer 48 with upper layer 46 not have such openings. Similarly, loop-containing layer 24 can also define a plurality of openings 56. In a refinement, the plurality of openings 52 and plurality of openings 56 are each independently arranged in parallel rows with each opening along a given row separated by about 3 to 10 mm and with adjacent rows separated by about 3 to 10 mm. Typically, adjacent rows will be offset and in particular, arranged with a hexagonal pattern.

Figure 6:
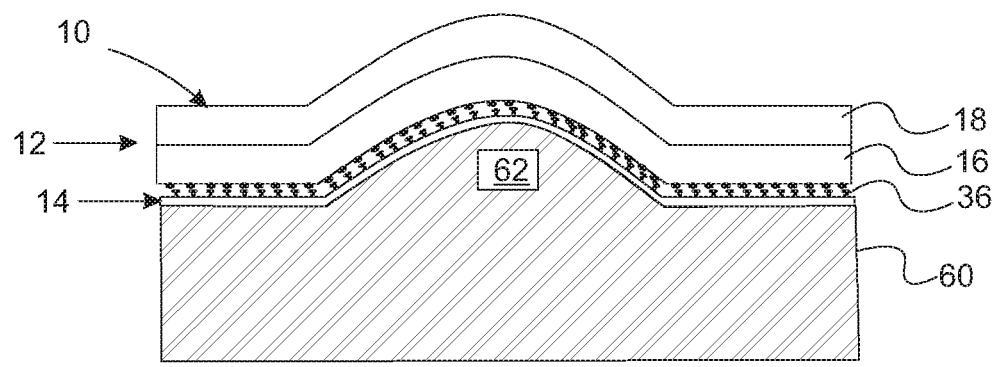
FIG. 6 provides a schematic cross section of a contour connect system installed over a foamed substrate.

With reference to FIG. 6, a schematic cross section of a vehicle component with a trim covering that incorporates the contour connect system set forth above. Foamed substrate 60 includes one or more undulations 62 which can define hills and valleys. The flexibility of low profile hook component 14 allows this component to conform to such a profile thereby allowing the subsequent attachment of fabric loop component 12. Examples of such automotive applications include, but are not limited to, attachment to a vehicle seat foamed substrate/padding, a head restraint foamed substrate (particularly near the closeout region), a foamed substrate proximate to a cup holder, and the like.

Figure 7B:
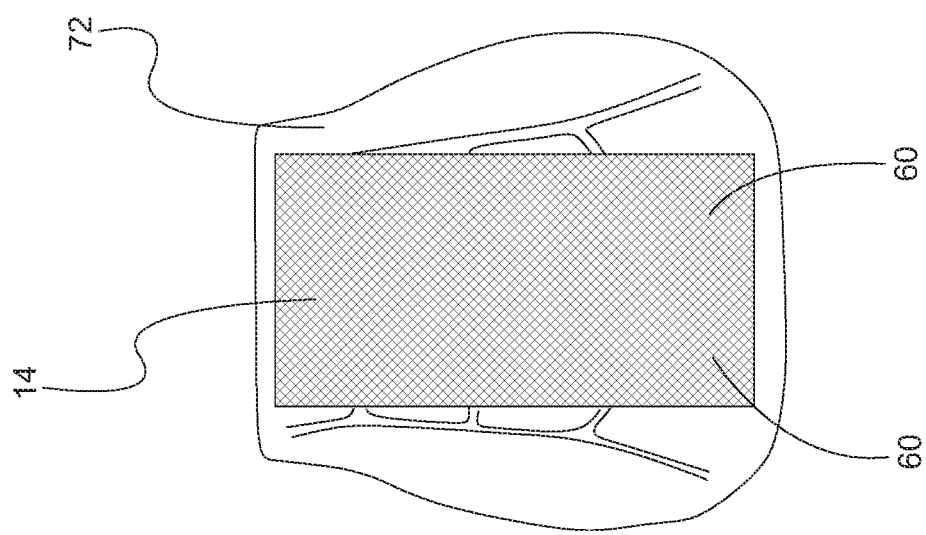
FIG. 7B provides a perspective view showing the placement of the low-profile hook component over foamed vehicle seat padding in a vehicle seat bottom.
Figure 7A:
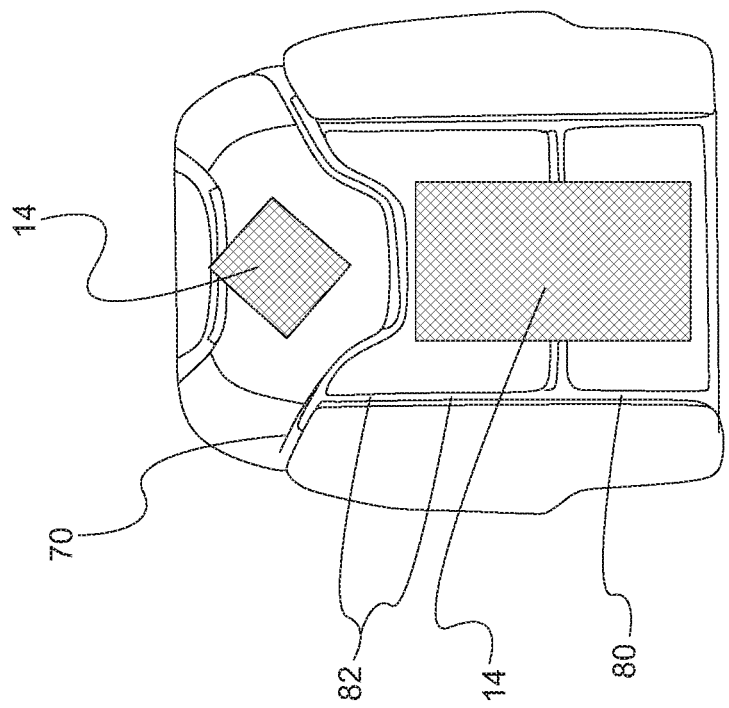
FIG. 7A provides a perspective view showing the placement of the low-profile hook component over foamed vehicle seat padding in a vehicle seatback.

With reference to FIG. 7, top views showing the placement of the low-profile hook component over foamed vehicle seat padding is provided. Seat back foamed cushion 70 and seat bottom foamed cushion 72 have low profile hook component 14 adhered to several locations. Fabric loop component 12 is then placed over the cushions to install the seat trim. Advantageously, the fastening design featuring low profile hook component 14 and fabric loop component 12 allows the trim covering to closely adhere to the contour of foamed cushions 70 and/or 72, even over relatively wide expanses where there is no other tiedown/fastening provided for the trim cover. This allows the trim cover to conform to contours in the foamed cushions with fewer or no other tiedowns. This provides for greater design freedom, in that it allows the use of greater expanses of interrupted trim cover (that is, greater areas of trim covering that are not formed by individual pieces sewn together), particularly over curved (concave/convex) surfaces. The use of this fastening method also improves durability in that it resists any tendency over time for the trim cover to form unattractively sagging.

The use of low profile hook component 14 and fabric loop component 12 can be employed in a trim cover fastening system that also includes conventional fasteners embedded in the foamed cushions 70 and/or 72. For instance, FIG. 5 shows that foamed cushions 70 and 72 can include trenches 80 in which clips 82 or other fasteners are embedded to capture corresponding fastening features included on the underside of the trim covering.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A contour connect system for applying a vehicle trim, the contour connect system comprising:
    a fabric loop component including a spacer layer, a Class A surface layer, and a loop-containing layer, the Class A surface layer being adhered to one side of spacer layer while the loop-containing layer is adhered to an opposite side of spacer layer; and
    a low-profile hook component including a sheet from which hooks extend a distance from about 0.5 to 2.5 mm.

2. The contour connect system of claim 1 wherein the Class A surface layer is leather, fabric, or vinyl.

3. The contour connect system of claim 1 wherein the low-profile hook component has a thickness from about 1 to 1.8 mm.

4. The contour connect system of claim 1 wherein the spacer layer is a spacer vent material or non-ventable foundation material.

5. The contour connect system of claim 1 wherein the spacer layer is a non-woven sheet or a polyurethane foam.

6. The contour connect system of claim 1 wherein the spacer layer has a thickness from about 1 mm to 50 mm.

7. The contour connect system of claim 1 wherein the Class A surface layer has a decorative pattern embossed or debossed thereon.

8. The contour connect system of claim 1 wherein the Class A surface layer is bonded to the spacer layer.

9. The contour connect system of claim 1 wherein the loop-containing layer is a napped fabric having a napped surface that provides loops for locking to low profile hook component.

10. A vehicle interior component includes a foamed substrate covered by the contour connect system of claim 1.

11. The vehicle interior component of claim 10 wherein the foamed substrate is a vehicle seat foamed substrate.

12. The vehicle interior component of claim 10 wherein the foamed substrate is a head restraint foamed substrate.

13. The vehicle interior component of claim 10 wherein the foamed substrate is a foamed substrate proximate to a cup holder.

14. A contour connect system for applying a vehicle trim, the contour connect system comprising:
    a fabric loop component including a spacer layer, a Class A surface layer, and a loop-containing layer, the Class A surface layer being adhered to one side of spacer layer while the loop-containing layer is adhered to an opposite side of spacer layer, the spacer layer including an upper layer and a lower layer with supporting threads arranged between the upper layer and the lower layer; and a low-profile hook component including a sheet from which hooks extend a distance from about 0.5 to 2.5 mm.

15. The contour connect system of claim 14 wherein the lower layer defines a first plurality of openings.

16. The contour connect system of claim 15 wherein the first plurality of openings is arranged in a hexagonal pattern.

17. The contour connect system of claim 15 wherein the low-profile hook component defines a second plurality of openings wherein the first plurality of openings is aligned to the second plurality of openings.

18. The contour connect system of claim 15 wherein the upper layer defines a third plurality of openings.

19. The contour connect system of claim 1 wherein the low-profile hook component includes aliphatic or semi-aromatic polyamides.

20. The vehicle interior component of claim 10 wherein the low-profile hook component includes a perforated substrate such that the perforated substrate is held to the foamed substrate by foam permeating the perforated substrate.

* * * * *